US009519687B2

(12) United States Patent
Dickie

(10) Patent No.: US 9,519,687 B2
(45) Date of Patent: Dec. 13, 2016

(54) MINIMIZING INDEX MAINTENANCE COSTS FOR DATABASE STORAGE REGIONS USING HYBRID ZONE MAPS AND INDICES

(71) Applicant: International Business Machines Corporation, Armonk, NY (US)

(72) Inventor: Garth A. Dickie, Framingham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 14/305,594

(22) Filed: Jun. 16, 2014

(65) Prior Publication Data
US 2015/0363404 A1 Dec. 17, 2015

(51) Int. Cl.
*G06F 17/30* (2006.01)

(52) U.S. Cl.
CPC ..... *G06F 17/3053* (2013.01); *G06F 17/30312* (2013.01); *G06F 17/30336* (2013.01); *G06F 17/30492* (2013.01); *G06F 17/30289* (2013.01); *G06F 17/30339* (2013.01); *G06F 17/30463* (2013.01)

(58) Field of Classification Search
CPC ............ G06F 17/30339; G06F 17/30336; G06F 17/30616; G06F 17/30321; G06F 17/30613; G06F 17/30424
USPC ............ 707/741, 673, 696, 700, 711, 830, 718,707/720, 802
See application file for complete search history.

(56) References Cited

U.S. PATENT DOCUMENTS

| 6,556,986 | B2 * | 4/2003 | Hara | ............... G06F 17/30342 707/999.002 |
|---|---|---|---|---|
| 6,973,452 | B2 | 12/2005 | Metzger et al. | |
| 7,080,062 | B1 | 7/2006 | Leung et al. | |
| 7,152,060 | B2 | 12/2006 | Borthwick et al. | |
| 7,415,573 | B2 | 8/2008 | Murayama et al. | |
| 7,484,068 | B2 | 1/2009 | Hu | |
| 7,774,336 | B2 | 8/2010 | Beyer et al. | |
| 7,958,113 | B2 | 6/2011 | Fan et al. | |
| 8,108,400 | B2 | 1/2012 | Graefe | |

(Continued)

FOREIGN PATENT DOCUMENTS

WO  WO2009072233  6/2009

OTHER PUBLICATIONS

IBM TDB (Dec. 2012). Estimating spread of data in database column based on customer's query execution using density function. IPCOM000224412D.

(Continued)

*Primary Examiner* — Dangelino Gortayo
(74) *Attorney, Agent, or Firm* — Mohammed Kashef; Edell, Shapiro & Finnan, LLC

(57) ABSTRACT

Elements of a database object are stored among a plurality of different storage regions, each storage region being associated with a first value range indicating upper and lower range values for element values within that storage region. An index is generated and maintained for one or more second value ranges that include range values that comprise subsets of the first value ranges. A query is processed that includes a query value and one or more storage regions to be read is determined by using one of the index and the first value ranges based on the query value relative to a second value range.

14 Claims, 8 Drawing Sheets

(56) References Cited

U.S. PATENT DOCUMENTS

| | | | |
|---|---|---|---|
| 8,176,021 B2* | 5/2012 | Kodavalla | G06F 17/30327 707/696 |
| 8,224,879 B2* | 7/2012 | Kuwahara | G06F 3/0605 707/827 |
| 8,234,295 B2 | 7/2012 | Haas et al. | |
| 8,341,180 B1 | 12/2012 | Arumugam et al. | |
| 8,380,714 B2 | 2/2013 | Inagaki | |
| 8,572,068 B2 | 10/2013 | Graefe et al. | |
| 2004/0039891 A1 | 2/2004 | Leung et al. | |
| 2005/0187917 A1 | 8/2005 | Lawande et al. | |
| 2012/0078904 A1 | 3/2012 | Agrawal et al. | |
| 2013/0073537 A1 | 3/2013 | Simon et al. | |
| 2013/0144815 A1 | 6/2013 | Luo et al. | |
| 2013/0254212 A1 | 9/2013 | Rao et al. | |
| 2013/0297587 A1 | 11/2013 | Singh et al. | |
| 2015/0012544 A1* | 1/2015 | Nishimura | G06F 17/30333 707/743 |
| 2015/0032684 A1* | 1/2015 | Gupta | G06F 17/30575 707/600 |
| 2015/0095299 A1 | 4/2015 | Dickie et al. | |
| 2015/0095379 A1 | 4/2015 | Dickie et al. | |
| 2015/0286682 A1* | 10/2015 | Ziauddin | G06F 17/30486 707/718 |
| 2015/0363404 A1 | 12/2015 | Dickie | |
| 2015/0363447 A1 | 12/2015 | Dickie | |
| 2016/0004727 A1* | 1/2016 | Tsuchida | G06F 17/30289 707/803 |

OTHER PUBLICATIONS

IBM TDB (Feb. 1988). Access Path Selection in Relational Database Systems. IPCOM000056992D.

List of IBM Patents or Patent Applications Treated as Related, Mar. 13, 2015.

Graefe, Goetz; "Fast Loads and Fast Queries", Hewlett-Packard Laboratories, Data Warehouse and Knowledge Discovery Lecture Notes in Computer Science, vol. 5691, 2009, pp. 111-124.

ip.com et al.; "Way of Improving Database Queries Performance by Automated Way of Creating Efficient Materialized Views (Containing Subset of the Columns)", IPCOM000227926D, May 29, 2013, pp. 1-5.

Baioco et al.; "An Effective Cost Model for Similarity Queries in Metric Spaces", ACM/SAC'07 Proceedings of the 2007 ACM Symposium on Applied Computing, Mar. 11-15, 2007, pp. 527-528.

List of IBM Patents or Patent Applications Treated as Related, Apr. 2016, 2 pages.

* cited by examiner

MINIMIZING INDEX MAINTENANCE COSTS FOR DATABASE STORAGE REGIONS USING HYBRID ZONE MAPS AND INDICES

BACKGROUND

Present invention embodiments relate to database access techniques that minimize costs associated with maintaining database indices with respect to costs associated with maintaining range (or zone) maps.

Searching for information using a query may result in a search of a large database table when an evaluation of the query indicates that the large database table should be scanned. In many data warehouse appliances, the hardware and software resources are balanced so that all components (e.g., storage, networking, CPU and accelerator resources) are busy when performing a large database table scan. The performance of such queries is improved not by optimizing any one component of the data path, but by identifying subsets of the rows with column values which do not need to be scanned. The "zone map" mechanism enables one form of resource optimization, while indices or indexes represent another form of data mapping.

For example, a zone map comprises metadata about each storage region in the form of range values or range maps that define minimum (min) and maximum (max) values for ranges in a given storage region. In other words, a zone map may comprise a plurality of range maps and as such, both zone maps and range maps comprise min and max values for a storage region (set of data) and in that sense the terms may be interchangeable. With respect to indices, an index comprises metadata that may point to a particular record or the start of a range of records within a storage region. Thus, in one sense, a range map may be considered as a range within which a given value may be found, should that value exist (i.e., the zone map range is inclusive, but there may not be an actual record within that range for a given index value). The zone map may be used to filter storage regions for the possible inclusion of desired content before actually reading and searching the stored data. In other words, a zone map may be used to eliminate rows in the large database table from consideration early in the scanning sequence before any unnecessarily large processing overhead has been incurred. In one example, if a storage region is known to contain records with column values between 100 and 200 (e.g., as stored in the range map metadata), then when a query with range values outside of that known range (e.g., a query with a value of 500) is evaluated, the evaluation can eliminate that storage region from being scanned.

The size of a given storage region for which metadata is maintained defines a resource tradeoff between processing resources and storage resources. For example, if the storage region is relatively large (e.g., three megabytes (MBs)), then a query that would otherwise return a relatively small data subset (e.g., 128 kilobytes (KBs) or 0.125 MB) requires loading the entire 3 MB storage region into memory for scanning, thereby increasing the use of memory resources, interconnect bandwidth from storage into memory, and storage device read bandwidth. If the scan region covered by the metadata is relatively small (e.g., 128 KB), then the volume of metadata becomes larger relative to the size of the metadata describing a 3 MB data storage region, thereby increasing the use of processing resources used to analyze a large amount of metadata. In this regard, a zone map itself requires storage (e.g., for example 24 bytes per storage region). If the scan region for each range map is too small, then the overhead incurred for creating and processing zone maps may become relatively large. Accordingly, zone maps and indices may become inefficient in certain respective situations.

Regarding indices, these data constructs can be inefficient to keep up-to-date. For example, upon each insertion of a row into a table, every index for that table requires an update and it is desirable to reduce the number of indices. On the other hand, indices can be much more efficient than zone maps for some queries. By way of example, consider a table with 1 billion rows, with a unique key, but stored in random order with respect to that unique key. An index will identify a single storage region to be read for any query on a specific key value. In contrast, a zone map will likely require reading almost all storage regions for the same query, because each storage region contains a wide range of keys due to the rows being stored in random order. Thus, it is desirable to have a mechanism for automatically identifying such situations when indices are more effective, and maintaining an index in only these identified situations.

BRIEF SUMMARY

According to one embodiment of the present invention, an element of a database object are stored among a plurality of different storage regions, each storage region being associated with a first value range indicating upper and lower range values for element values within that storage region. A computer-implemented method generates and maintains an index for one or more second value ranges that include range values that comprise subsets of the first value ranges. A query is processed that includes a query value and one or more storage regions to be read is determined by using one of the index and the first value ranges based on the query value relative to a second value range.

Embodiments of the present invention further include a system and computer program product for minimizing index maintenance costs for database storage regions using a hybrid zone map and indices scheme in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
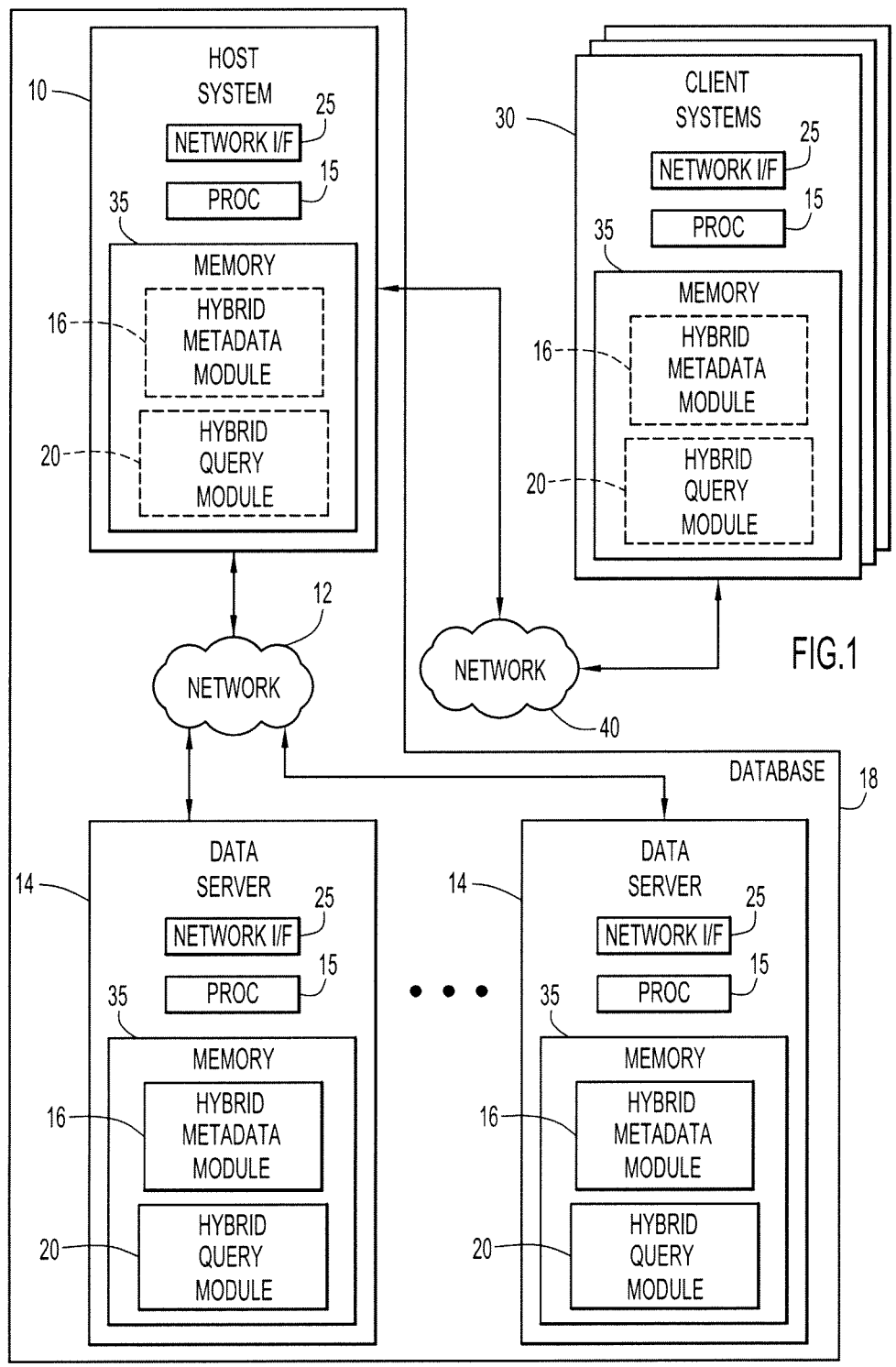
FIG. 1 is a diagrammatic illustration of an example computing environment for use with an embodiment of the present invention.

Present invention embodiments improve optimization of a search engine (e.g., a database search engine) by hybridizing the concept of the metadata describing storage regions, e.g., zone/range maps and indices, which may provide further granularity for a particular search. Operational efficiencies may be optimized by way of the techniques of present invention embodiments described herein by striking a balance between the use of zone maps and indices by way of a hybrid data structure that includes both zone/range map information as well as index information. In order to achieve the balance, probabilistic techniques may be employed to determine the tradeoff between the use of zone maps and indices.

For example, when traditional database query evaluation requires scanning a large table, it is beneficial to eliminate table rows from consideration very early in processing, i.e., before much effort is devoted to processing those rows. Some database management systems (DBMSs) maintain metadata about each region of table storage in order to filter table rows before actually reading the data stored in those rows (e.g., an I/O transfer from disk to volatile memory). The metadata may contain value ranges or range maps that indicate minimum (min) and maximum (max) values for a given column (col) variable (e.g., the min/max values among individual column values stored in a database cell). Accordingly, the range/zone map metadata may be of the form: col 1 {min value, max value}. For example, if a storage region is known to contain records with column values between 100 and 200 (i.e., col 1 {100, 200}), then a query restricted to records with column values greater than 500 will not read that storage region. However, if a query has a value from 100 to 200, including the values of 100 and 200, then that storage region may be read and searched. In this regard, a range map may identify upper and lower range values or bounds for data within a given storage region. The upper and lower bound may be conservative or inclusive of that bound. In one example, for a given storage region, values that are less than or equal to the upper bound (e.g., a max) in storage region's metadata, and greater than or equal to the lower bound (e.g., a min), may be found in that storage region.

In contrast, an index provides a pointer to a record (e.g., column value) with a specific value. When the column values associated with a given index are sorted, then an index may provide a starting or stopping point for a search. One disadvantage of indices is that when records are added or deleted, then the index (e.g., its pointer or associated data) needs to be modified to accommodate the database changes, which can be computationally and input/output (I/O) intensive due to adjacent indices requiring similar pointer/data updates. In other words, a change in one index pointer usually requires other index pointers to be adjusted for a given storage region. For example, if records are inserted above a given index, then all indices for records below the insertion must be incremented accordingly. When range maps are employed, record addition and deletion may not require a change in the range map as long as those record's column values fall within the range map.

The size of a storage region for which metadata is maintained can affect search engine performance. If the metadata covers a storage region that is relatively large (e.g., three megabytes (MB)), then even a query that returns a single row from that storage region results in reading the entire region into active memory (e.g., random access memory (RAM)), which has a cost in storage bandwidth, communications (I/O) bandwidth from the storage to the memory, and the use of the storage region's memory. If the metadata covers a storage region (or a storage region not covered by a range map) that is relatively small (e.g., 128 kilobytes (KB)), then an index pointing within that smaller storage region is less beneficial than an index into a larger storage region (e.g., due to scaling effects).

In order to facilitate the description, data granularity may be referred to in terms of pages and extents. By way of example, a page of data may be 128 KB, while 24 pages or 3 MB (i.e., 128 KB×24 pages=3 MB) may be defined as an extent. The range map or range map hierarchy (i.e., nested range maps) may include a range of values for both extents and pages, where a page range map describes a subset of the data described by an extent range map. Depending on the level of storage region overlap (e.g., as captured by a range map), data to be processed may be described via a list of storage regions to be processed at the page level (i.e., one page at a time) or at the extent level (i.e., 24 pages at a time). Searches may be performed at various levels of granularity, for example, between a page and an extent level (e.g., a zone may comprise a plurality of pages).

In a system with zone maps but no indices, looking for an individual record can be expensive in certain situations since the search may consume computing and I/O resources, and may require scanning the entire table. There is growing business demand for a single system to support both warehouse and operational analytics workloads. Record lookup could be made more efficient by adding an index for the key column used for the lookup. But index maintenance is relatively expensive and it may be impractical to add indices on all columns. Zone map maintenance is much simpler, so that it is practical to maintain zone maps for every column in a table.

In some real-world situations, zone maps are just as effective as indices. If the records in the table are ordered by the column used for the lookup query, then the zone maps are non-overlapping or overlap only on single or endpoint values. In this case, zone maps provide perfect information about the pages which should be read. If the key values in a zone cover a dense range, then the zone map entry for that zone provides just as much information as the index, i.e., a value between the min and max values for the zone is guaranteed to appear in the zone. If the records in the table are clustered by several columns, including the column used for the lookup query, then the zone maps may suggest several pages to be read. As long as the number of pages selected using zone maps is small, there is not a significant cost versus using an index (e.g., in a scan-optimized platform that will always process entire pages, even when an index is used).

Finally, if the column used for the lookup has low cardinality and poor value ordering within, the index will not be effective (i.e., it will identify all pages). In this case any effort spent on maintaining an index is "wasted." The techniques of present invention embodiments described herein, provide a way to hybridize zone maps and indices, such that the costs for index maintenance is only incurred for those columns, and for those value ranges, for which the index provides better information than the zone map. As such, a "zone-map-effectiveness" data structure is maintained of a size similar to the size of the zone map. In ranges of values for which the zone maps are not effective, an index is maintained (and a possibly conservative index). When a lookup occurs, the zone map effectiveness data structure is examined first. If the value corresponds to an index, an index lookup is performed. If the value does not correspond to an index, then the zones potentially containing that value are identified using the zone map data structure.

The zone map effectiveness data structure effectively is an index "indicator" and is referred to hereinafter as such. The index indicator provides an effective mechanism for adapting to regions of a table which have low zone map effectiveness (i.e., when indexing may prove beneficial). The index indicator also provides a mechanism for discovering, on the fly, that all values of a column are best supported by an index, and that the index may be generated incrementally and during periods with available processing time.

Data warehouse queries often scan entire tables by applying row-selection predicates (e.g., one or more search criteria coupled by Boolean operators such as OR, AND or NOT). Database systems are typically I/O limited, because the amount of processing per row is small compared to the I/O cost of reading the row (whether from disk, from solid state drive (SSD), from DRAM, or from some level in a CPU cache hierarchy), so that analytic query performance is determined by the amount of data read. Queries which filter on a well ordered column such as dates are well served by zone maps. But zone maps may not work well for other columns. In these cases, it may become desirable to automatically switch to a mechanism such as indices, for those columns where an index is more effective.

In general, zone maps are inexpensive to use and maintain relative to indices, and can be maintained for all columns of a table. Thousands of records can be inserted into a table with only a few updates to the associated zone maps. For ordered or clustered data, zone maps provide good selectivity. In contrast, indices are expensive to maintain. For example, inserting thousands of records may require thousands of index updates. For point queries, indices provide the best selectivity. But since they are expensive, indices are added only where needed. In one example, an analysis of the current database system workload can be used to add or drop indices or to decide which columns may be used as keys in point queries, and then decide which value ranges (if any) should be indexed. Accordingly, the techniques of present invention embodiments described herein provide a balanced approach to the costs of indices in contrast to the simplicity of zone maps by way of a cost balancing function that may use probabilistic or other cost analysis techniques.

An example environment for use with present invention embodiments is illustrated in FIG. 1. Specifically, the environment includes one or more server or host systems 10, and one or more data servers 14. Host systems 10 and data servers 14 may be remote from each other and communicate over a network 12. The network may be implemented by any number of any suitable communications media (e.g., wide area network (WAN), local area network (LAN), Internet, intranet, etc.). Alternatively, host systems 10 and data servers 14 may be local to each other, and communicate via any appropriate local communication medium (e.g., local area network (LAN), data center network, hardwire, wireless link, intranet, etc.). One or more clients or end user systems 30 may be coupled to host systems 10 via a network 40, or by a data center network or data center edge switch.

Host systems 10, data servers 14, and clients 30 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.), optional input devices (e.g., a keyboard, mouse or other input device), and any commercially available and custom software (e.g., server/communications software, hybrid metadata module, hybrid query module, browser/interface software, etc.). Data servers 14 may comprise compute and storage nodes or database engine blades (e.g., in a datacenter or server farm).

Data servers 14 may receive user query information related to desired database information (e.g., data, documents, etc.) from host systems 10. In another example, the information and queries may be received by the data servers, either directly or indirectly (e.g., from a client system). The host systems 10 may include a hybrid metadata module 16 to generate a hybrid zone maps that may comprise range maps, indices and index indicators (i.e., the index indicators provides a mechanism to choose between range maps and indices when processing a query). The hybrid zone map may contain other cost or probabilistic data in addition to or as part of the index indicators. The host systems 10 may also include a hybrid query module 20 to process search requests using hybrid zone maps.

One or more components of the host systems 10, network 12 and data servers 14 may comprise a database management system (DBMS) or database 18. The database system 18 may use any conventional or other database, or storage unit. Other DBMS components may be local to or remote from host systems 10 and data servers 14, and may communicate via any appropriate communication medium such as network 12 and/or network 40 (e.g., local area network (LAN), wide area network (WAN), Internet, hardwire, wireless link, intranet, etc.). Any clients, hosts, or data servers may present a graphical user interface (e.g., GUI, etc.) or other interface (e.g., command line prompts, menu screens, etc.) to solicit information from users pertaining to hybrid zone maps and storage, and to provide results (e.g., hybrid zone map statistics, number of indices generated, predicted I/O and processing savings, etc.). Further, these systems may provide reports to the user via the display or a printer, or may send the results or reports to another device/system for presenting to the user.

Alternatively, one or more hosts 10 or clients 30 may generate hybrid zone maps and perform query processing when operating as a stand-alone unit (i.e., without using data servers 14). In a stand-alone mode of operation, the host/client stores or has access to the data (e.g., hybrid zone maps, databases, etc.), and includes hybrid metadata module 16 to generate hybrid zone maps and hybrid query module 20 to perform queries. The graphical user interface (e.g., GUI, etc.) or other interface (e.g., command line prompts, menu screens, etc.) solicits information from a corresponding user pertaining to hybridizing metadata, and may provide reports including hybridization results (e.g., hybrid zone map statistics, number of indices generated, predicted I/O and processing savings, etc.).

Hybrid metadata module 16 and hybrid query module 20 may include one or more modules or units to perform the various functions of present invention embodiments described below. The various modules (e.g., hybrid metadata module, hybrid query module, etc.) may be implemented by any combination of any quantity of software and/or hardware modules or units, and may reside within memory 35 of the host and/or data servers for execution by processor 15. It should be understood, that the computing environment depicted in FIG. 1 provides example platforms (e.g., host systems 10, backend or data servers 14) for illustrating the techniques described herein. In this regard, data and hybrid zone maps on one data server 14 may have no relationship with data and hybrid zone maps on another data server 14.

Figure 2:
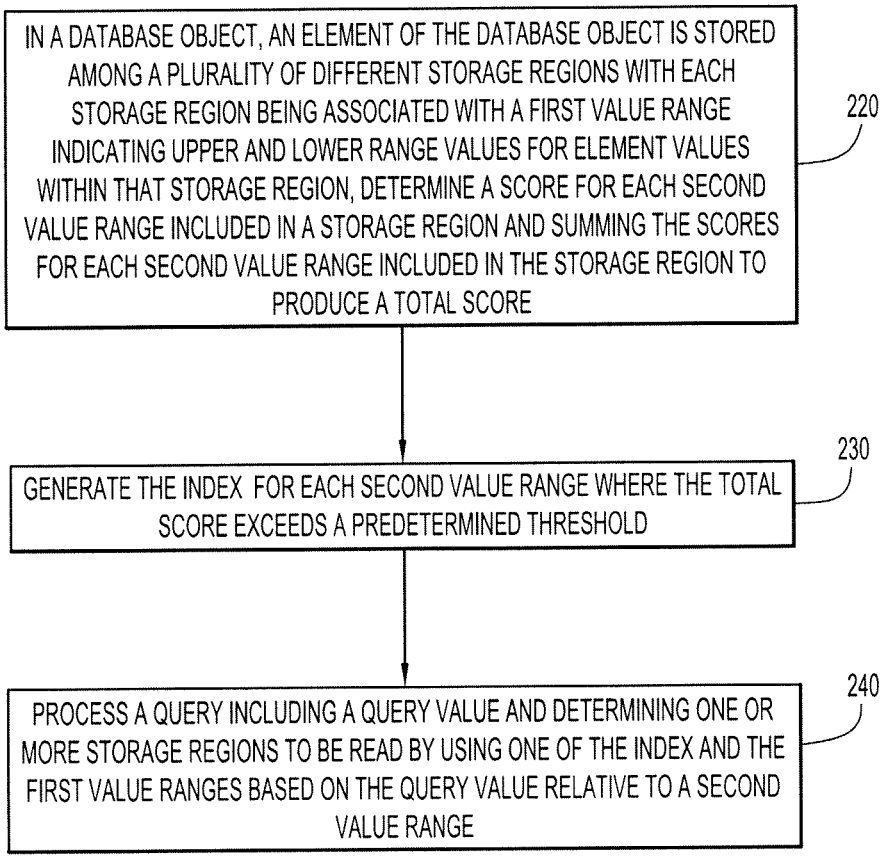
FIG. 2 is a procedural flow chart illustrating a manner in which indices and zone maps are employed in a manner that minimizes the costs associated with maintaining indices and range maps when searching a database according to an embodiment of the present invention.

A manner in which hybrid metadata module 16 and hybrid query module 20 (e.g., via a host system 10, client systems 30 and/or data server 14) access data within a database object according to an embodiment of the present invention is illustrated in FIG. 2. Initially, an element (e.g., a column) of the database object (e.g., a table) is stored among a plurality of different storage regions with each storage region being associated with a first value range indicating upper and lower range values for element values within that storage region. Second value ranges may be determined by intersecting the first value ranges from several or all storage regions for a column. In this case, each second value range represents a range of values which are present in a common set of storage regions.

A score for each second value range is determined (i.e., a score for each storage region may be assigned) and the scores for each second value range are summed to produce a total score at step 220. Thus, the total score may be the sum of the scores of second value range (each storage region) which overlaps the first value range. The score may indicate a probability of a value from the associated value range being absent from that storage region. In basic terms, a ratio of a number actual column values in a page to a number of column values available in the column's range map is equal to a linear probability of a given value (e.g., a search/query value) being present. The value of one minus probability of a given value being present is equal to a linear probability of a given value being absent, as determined at step 220. An index for each second value range where the total score exceeds a predetermined threshold (e.g., as denoted by T) is generated at step 230. Various techniques and operational scenarios with respect to the inventive concepts outlined by steps 220 and 230 are further described in connection with FIGS. 3-5 and 7-9.

The index, e.g., as generated at step 230, may be used to process a query. For example, a query is processed including a query value to determine one or more storage regions to be read by using one of the index and the first value ranges based on the query value relative to a second value range at step 240. Based the query value (predicate(s)), the index indicator and the index itself, data are accessed from the storage regions for the query based on one of the index and the first and second range values of the storage regions in accordance with the index presence determination at step 240. Further operations with respect to the inventive concepts outlined by step 240 are further described in connection with FIGS. 6A and 6B.

Regarding determining the score or probability of a value from the associated value range being absent from that storage region, e.g., as determined at step 220, the database or database tables may be subdivided into storage regions (e.g., extents and pages of a given size). The size of the extents and pages may be chosen for optimization on a particular computing system (e.g., main frame, personal computer, cloud computing, etc.). Each storage region is associated with an interval including first and second interval values indicating a value range for elements within that storage region (e.g., min and max values as described above).

Initially, a hybrid zone map data structure for each page or column within each table is maintained. This data structure may include a sorted array of value intervals that appears similar to a histogram and is described herein in connection with several of the figures. A value of the data structure is interpreted as the probability that reading zones overlapping the interval will perform wasted work by not discovering a record with the specified key value (i.e., the probability that a record is absent). The hybrid zone map may include indices, pointers to a separate indexing data structure, range maps, zone maps, index indicators or merely a collection of pointers to allow access to the various data structures.

As each database page is written into a database, the min and max values for a column in the page are computed. For the endpoint values, the probability that reading the zone will find a record with an endpoint value is 1 or 100% since the value is already present, while the probability of wasting the read is 0 (i.e., according to a normalized probability scale from zero to one). For values in the interior of the range, the probably of a wasted read is a function of the density of values within the range. For example, in a dense integer range (with every integer value present), the probability of a wasted read is 0 throughout the range. For a zone containing long character strings that do not have matching characters or strings, the probability of a wasted read is (approximately) 1. For an integer range containing about one quarter (¼) of the possible values between the min and max, the probability of a wasted read is three quarters (¾ which is (1−¼)) or 0.75.

Consider this probability as a variable or function $Z(x)$, where $Z(x)$ is the probability of a wasted read, or the loading into memory pages or extents that do not have the information that would satisfy a query or other database search, i.e., no search results, for a given query value of x. The probability of a wasted read is zero outside of the min/max bounds, because zone map evaluation will cause the page to be excluded. The probability of a wasted read is also zero for the exact min/max bounds (i.e., the known min/max values of the range will cause zone map evaluation to include the page because either the min or max value will be found). The probability of a wasted read is some higher value on the interior values. For example, consider the integer column values denoted by {0, 1, 2, 3, 8}. The 3 integer values on the interior and exclusive of the endpoints have three different values {1, 2, 3} within the range of 0 to 8 ([0, 8]) when the highest and lowest values {0, 8} are removed from consideration (i.e., when range's known min/max values are removed from consideration), a range of [1, 7]. In one example, if a query predicate x has a single digit integer value that is within the range map (e.g., x could be 1, 2, 3, 4, 5, 6 or 7). The probability of finding x is 3 out of the 7 interior values (3/7=~0.43), i.e., x could be 1, 2 or 3. The probability of not finding x inside of the endpoints, $Z(x)$, is 4 out of the 7 interior values (4/7=~0.57), i.e., x could be 4, 5, 6 or 7. Thus, $Z(x)$ would equal ~0.57 for each discrete value in the range [1, 7].

The probability function for a set of values, $Z(x)$ may be computed for plural data sets (e.g., pages, extents, or other set). The $Z(x)$ for each data set is summed into effectiveness function $E(x)$, i.e., $E(x)=\Sigma Z(x)$ for each data set. The effectiveness function E(x) can be interpreted as the expected number of wasted reads when zone maps alone are used to look up a particular value x. The effectiveness function E(x) or a pointer thereto may be added to the hybrid zone map. A detailed example for computing E(x) is provided in the text below.

In order to use the effectiveness function E(x), a database configuration or tuning parameter may be used, such as a threshold value (T), for example, the value of T=10. For each data point that that may be used as a predicate, x, it is determined whether E(x)>10. If E(x)>10 for x, and x is in a given data set, then a decision may be made to generate an index for the values in the given data set. At the decision point, all zones that have data points where E(x)>10 may be re-read so that their values may be added to an index, and subsequent writes of new pages may be provisioned to update the index as part of the initial write path. The decision may be permanent or temporary, and is flagged in the hybrid zone map data structure representing the function E(x). As explained further hereinafter, one benefit is that the hybrid zone map data structure provides a mechanism to automatically adapt from zone maps over to indices, and vice versa, to avoid the cost of indices where they will not be effective. In general, it is most effective to add all values in the processed zones to the index, even values outside of the indexed range. This technique limits page re-processing of any page to a singe re-processing iteration, even though additional sets of x may later require an index (i.e., because those values of x are already indexed).

In other examples, the indices in a given hybrid zone map may be dropped or reconstructed. When a range map changes, the Z(x) for values in the range maps in new pages may be added to E(x) or subtracted for deleted pages. If E(x) exceeds an indexing threshold T (e.g., E(x)>10), then indexing or re-indexing may be performed. Likewise, if E(x) drops below a drop threshold, $T_D$ (e.g., E(x)<5), then the index may be dropped from or re-indexed into the hybrid zone map. The various thresholds may be adapted to prevent hysteresis with respect to data modified with a high frequency.

In order to provide a basis for distinguishing, in simple terms, data queries that benefit from zone maps versus data queries that benefit from indices, several examples are now provided. In a first example, integer column data (that, as explained, does not need indices) may be represented by the values {9, 1, 3, 2, 2, 2, 5, 6, 5, 6, 7, 8, 9}. This integer data may be broken across (while, e.g., maintaining digit order) four pages of integer data, e.g., {9, 1, 3}, {2, 2, 2}, {5, 6, 5} and {6, 7, 8, 9}. The range maps (min/max) for the four pages may be represented by [1, 9], [2, 2], [5, 6] and [6, 9], respectively. The value densities (# of actual values/# of all values in the range) for the column values in the first page is three different integers {9, 1, 3} out of nine possible integers in the range map of 1 to 9 [1, 9] or 3/9. The second page contains all 2's, and therefore has a three identical single values of 2 with a range map of [2, 2], thereby having a density (# of actual values/# of all values in the range) of 1/1 or one. In the third page, all values are also inclusive of the endpoints [5, 6] and therefore have a value density (# of actual values/# of all values in the range) of 1. In the fourth page all integer values are also fully spanned within endpoint values [6, 9] and therefore have a value density (# of actual values/# of all values in the range) of 1, i.e., four different values {6, 7, 8, 9} within the range map of [6, 9] giving a density of 4/4 or one.

In terms of the effectiveness function E(x), those ranges with a density of one do not need indexing since indexing does not provide any additional information with respect to probability of a given value being within the range. In other words, a query that relies on a zone map will produce a "found" or "not found" search result with respect to the values within pages that have a value density of one. That is, an expected read failure, E(x), is zero for pages 2-4, and a non-zero value with respect to the first page.

With respect to the first page with values {9, 1, 3} and with the range map of [1, 9], eliminating the endpoints (the endpoints providing a search result of 100% certainty when the endpoint value is part of the query) provides an interior/non-endpoint range of [2, 8], or seven inclusive values {2, 3, . . . , 8} or [2-8]. Since the value 3 is the only one of the seven interior (non-endpoint) values in the first page values {9, 1, 3}, the probability of a match for any given value in that range is 1/7, or in terms of not finding a result 6/7 (i.e., 1−(1/7)). Accordingly, when a search value x is entirely within the endpoint values, the probability of finding a result, all other considerations being equal, is one out of seven (1/7), or not finding a result is six out of seven (6/7). Thus, Z(x) for pages 2-4 is zero, while Z(x) for page one is 6/7 across those pages that contain x. Examples, of the summation of Z(x) to obtain E(x) is described hereinafter.

Thus, regarding page one, when the query value of x is one or less (x<=1), or nine or greater (x>=9), the expected number of unnecessary I/O operations/searches with respect to page one is zero, or Z(1)=0 plus Z(9)=0. On the interior, when x=2 . . . 8, the probability of a non-result, Z(x) is 6/7 for a random distribution of x values. Thus, the sum of expected non-result values across the four pages is E(x)=0 for x<=1 and x>=9, and E(x)=6/7 for 2<=x<=8. Since the values across all four pages in the above example are tightly coupled, maintaining indices for these pages is deemed cost intensive or otherwise unnecessary.

In another example, that contrasts the data of first example (that finds indices unnecessary), example column data are provided that indicates benefits of using indices. For the description below, consider the column data represented by the values {1, 9, 7, 0, 8, 2, 1, 7, 3, 2, 9, 5}. This integer data may be broken across three pages of integer data (while, e.g., maintaining digit order) further labeled A, B and C, and comprise the following values: A {1, 9, 7, 0}, B{8, 2, 1, 7} and C{3, 2, 9, 5}. The range maps (min/max) for the three pages may be represented by [0, 9], [1, 8] and [2, 9], respectively.

The value densities for the column values in page A is four different integers A {1, 9, 7, 0} out of ten possible integers in the range map of 0 to 9 [0, 9], inclusive of the endpoints, or 4/10. The value densities for the column values in page B is 4/8 for the four integers B {8, 2, 1, 7} in the range map of [1, 8], inclusive. Page C has a value density of 4/8 for the integers values C{3, 2, 9, 5} with a range map of [2, 9], inclusive. Stripped of their respective endpoint values, the value densities become 2/8, 2/6 and 2/6, respectively (i.e., two is subtracted from both numerator and the denominator of each value density ratio). The corresponding Z(x) values for integers in these three pages is equal to one minus the respective value density. For example, Z(x) for page A is (1-2/8) or 6/8 for all interior integer values, which is ¾ when the smallest denominator is employed. Z(x) for an integer present in pages B and C is (1-2/6) or 4/6, which is ⅔ when the smallest denominator is employed. Z(x) for page A may be denoted as ZA(x) and denoted as ZB(x) and ZC(x) for pages B and C, respectively.

The values of the function E(x) is the sum of Z(x) values for each page (e.g., E(x)=ZA(x)+ZB(x)+ZC(x), for each x within the range all of interior values across the three pages A, B and C that make up the zone, as indicated above (e.g., as determined by hybrid metadata module 16 at step 220). Accordingly, the zone, with pages A, B and C has an interior discrete integer value range of {1, . . . , 8}. The effectiveness function for x=1, E(1), is the sum of ZA(1), ZB(1), and ZC(1), which is ¾+0+0=¾ (0.75). Note that ZB(1) is within page B's total range map of [1, 8], but not in page B's interior (non-endpoint) range map of [2, 7]. Also note that the integer value of "1" is completely outside the range map of page C. Thus, as described above, endpoint values and values outside of the range map are assigned a probability of zero (i.e., there is no possibility of reading pages B and C when the query predicate is "1").

Figure 3:
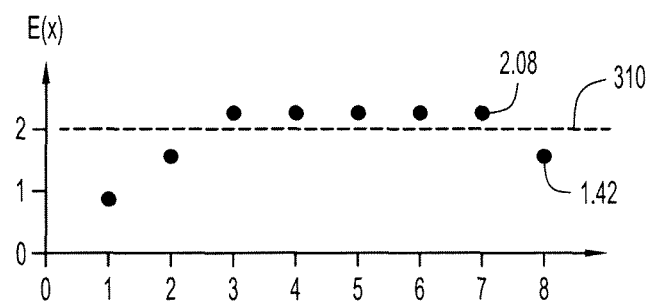
FIG. 3 is a graph illustrating a probability threshold and a probability function for integer values according to an embodiment of the present invention.

Next, E(2) is computed and is the sum of ZA(2), ZB(2), and ZC(2), which comes to ¾+⅔+0=17/12 (~1.42). E(3) is computed and is the sum of ZA(3), ZB(3), and ZC(3), which is ¾+⅔+⅔=25/12 (~2.08). E(4), E(5), E(6) and E(7) are all computed to be the same value as E(3) or 25/12 (~2.08). The last value in the series is E(8), which is computed as the sum of ZA(8), ZB(8), and ZC(8), which is ¾+0+⅔=17/12 (~1.42). Thus, E(x), for x=1 to 8 is {0.75, 1.42, 2.08, 2.08, 2.08, 2.08, 2.08, 1.42}. A plot of these values is depicted in FIG. 3. As viewed in FIG. 3, the vertical axis indicates positive real values for E(x), while the horizontal axis contains discrete integer values for the value range from 0 to 8.

Figure 4:
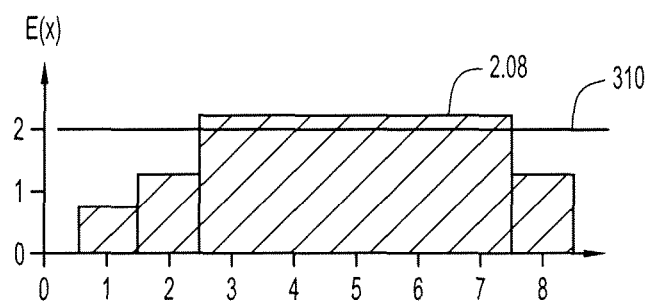
FIG. 4 is a histogram illustrating the threshold and probability function for integer values from FIG. 3 according to an embodiment of the present invention.
Figure 5:
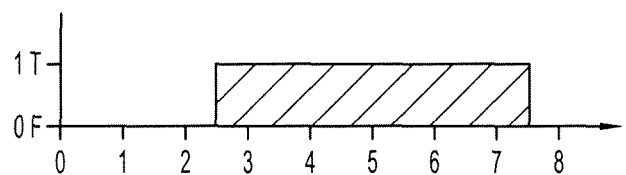
FIG. 5 is a binary (true/false) histogram illustrating whether a given probability for integer values from FIG. 4 exceed a threshold according to an embodiment of the present invention.

In this example, the threshold value for determining whether or not to generate and maintain an index is set to a value of two (i.e., T>2) as indicated at reference numeral 310 in the figure (e.g., as determined by step 230). The data shown in FIG. 3 are also shown in FIG. 4 in the form of a histogram with each rectangle bracketing or encompassing its supporting integer on the horizontal axis. The histogram from FIG. 4 is converted to binary (true or false) histogram as shown in FIG. 5. For every integer that has an E(x)>2, the corresponding histogram value is set to true, otherwise the value set to false. Accordingly, since the integer values in the range from 3-7 all exceed the threshold of 2 (i.e., 2.08>2), these integers have a value of "true" (T) in FIG. 5, while all other value are set to "false" (F) or zero. In the form of a simple, but sorted, data structure, the values in FIG. 5 can be represented by the simple function: 3 (or greater)=true, but 8 (or greater)=false, which indicates integer values from 3-7 are true and all others are false. The presence of these "true" values indicates that an index should be generated and maintained for those pages that include at least one true value or in this case, all pages A, B and C.

Once the probabilities of a given predicate value, x, being absent from a given storage region (e.g., are produced at step 220), an index for each element value of one or more element value intervals is generated in response to combined probabilities (e.g., E(x)) of one or more storage regions with element values in that element value interval exceeding a threshold, T, where each element value interval includes a range of element values (e.g., as generated by hybrid metadata module 16 at step 220). Thus, the element values (e.g., integer, strings, dates, etc.) may be indexed according to the pages that those values may found.

In the above described example, with pages A { 1, 9, 7, 0}, B {8, 2, 1, 7} and C {3, 2, 9, 5}, each of the values is indexed. Each of the FIGS. 3, 4 and 5 provide a visual representation of an index status structure or data structure that indicates the presence (or absence) of an index (e.g., true or false, or greater or less than a threshold). If any value in a given page has a corresponding "true" indication (e.g., as indicated in FIG. 5) that page may be included in the index. Thus, the values in FIG. 5 form an index "indicator" that indicate the presence of an index. In this example, at least one value in each page indicates "true" and all three pages A, B and C are indexed, accordingly. The combination of pages A, B and C contain values from 0 to 9, with the values of 4 and 6 being absent. For example, the predicate query value 0 may be found only in page A, while the predicate query value 1, may be found in both pages A and B, and so on. When fully expanded, index values may be stored in table form:

|  | Value | | | | | | | |
| --- | --- | --- | --- | --- | --- | --- | --- | --- |
|  | 0 | 1 | 2 | 3 | 5 | 7 | 8 | 9 |
| Page | A | A, B | B, C | C | C | A, B | B | A, C |

The above index may be used to process a query including an integer predicate value (e.g., x) and determine the presence of an index for the given query predicate (e.g., as determined at step 240). Based on the query predicates, the index indicator and the index itself, data are accessed from the identified pages (e.g., pages A, B and C) or other storage regions for the query based on one of the index and zone or range maps of the storage regions in accordance with the index presence determination (e.g., as accessed at step 240).

Figure 6A:
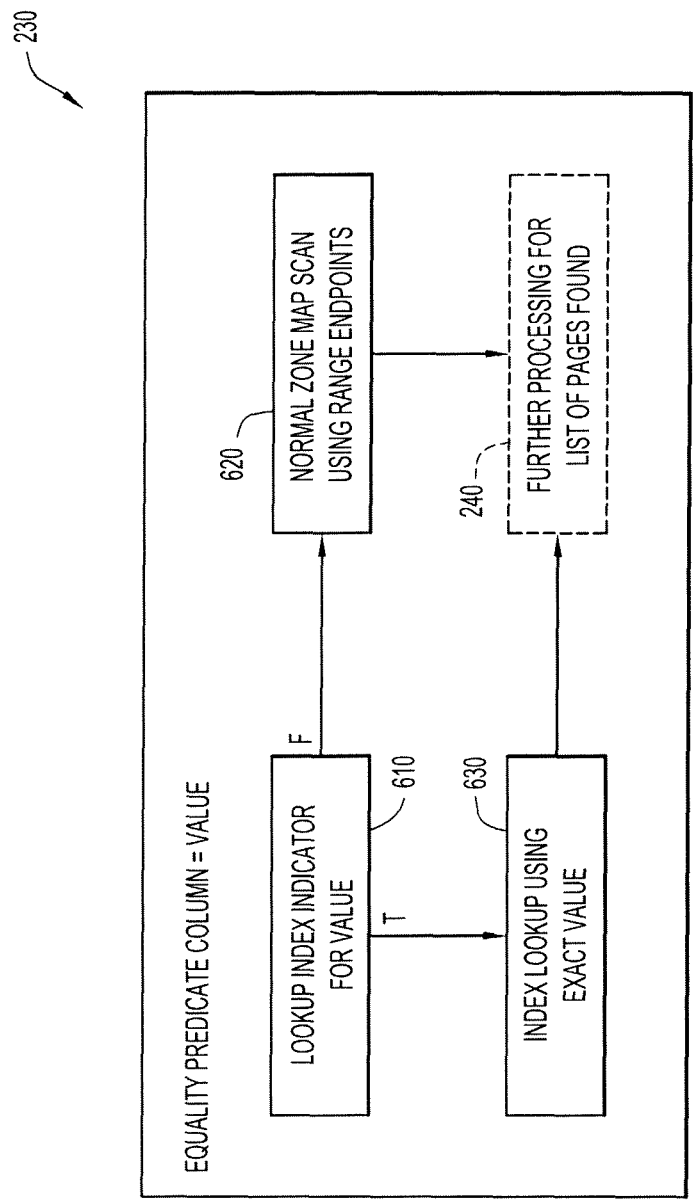
FIGS. 6A and 6B are procedural flow charts illustrating a manner in which exact value query and range value query predicates may be processed a using hybrid zone map and indices scheme according to an embodiment of the present invention.
Figure 6B:
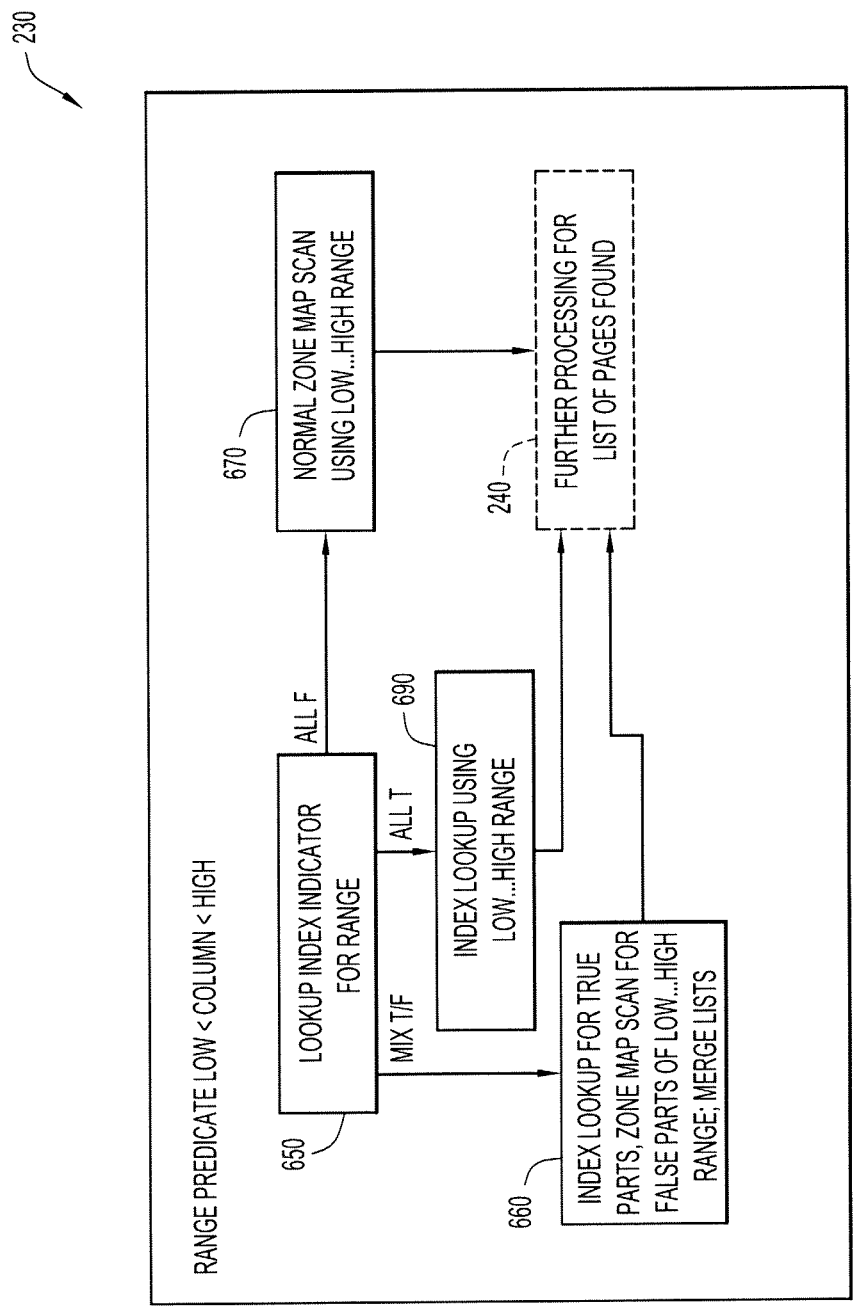

To further illustrate the hybrid zone map query processing and data access techniques described herein, reference is made to the flow charts presented in FIGS. 6A and 6B (e.g., as executed by hybrid query module 20 with respect to step 240). As viewed in FIGS. 6A and 6B, the solid lined boxes are associated with functions that may be performed in connection with step 240, while the dash lined boxes, labeled 240, perform a similar function with respect the description provided in connection with FIGS. 2, 6A and 6B.

Referring to FIG. 6A, and with continued reference to FIG. 5 and the above index table, a flowchart is described for predicates with a given integer column value. For example, given a database query with a predicate of x=2, a lookup in the index indicator (FIG. 5) at step 610 indicates "false" for the value of 2. With a false indication, the query can avoid any indices and proceed to a typical zone map scan using range map endpoints at step 620. In this case, all three range maps [0, 9], [1, 8] and [2, 9] contain the value of 2 and all three pages A, B and C would be scanned for the value 2.

In a second example, given a database lookup up query with a predicate of x=4, the index indicator (FIG. 5) indicates "true" for the value of 4 at step 610, so the index would be consulted. An index lookup using the given query integer value is performed at step 630. However, the value of x=4 is not present in the index table above. As a result, no pages would be loaded or scanned, thereby sparing I/O and processing capacity. In a third example, given a database lookup up query with a predicate of x=9, the index indicator (FIG. 5) indicates "false" for the value of 9 at step 610 and, at step 620, the range maps indicate that pages A and C should be scanned. Accordingly, further processing or scanning is performed at step 240, and pages A and C would be scanned for x=9. In a last example, given a database lookup up query with a predicate of x=5, the index indicator (FIG. 5) indicates "true" for the value of 5 at step 610, and an index lookup is preformed at step 630. The index lookup would indicate that x=5 is present in page C and page C would be scanned at step 240. It should be noted that the above index values need may be maintained for those values that the index indicator (FIG. 5) indicates are "true" (e.g., values 3-7), or may be maintained for values in a page as described above (e.g., to avoid re-reading the page at a later time if it is decided to index a larger range).

Referring to FIG. 6B, a flowchart is described for query predicates with a range of values, e.g., for column values within a range from a low value to a high value. FIG. 6B will be described in general and without the use of specific values. However, the operations described in connection with FIG. 6B are naturally extensible from the examples provided herein, with or without example data. Index indicators (T/F) are looked up for each value in the query range at step 650. At this point, the plural lookups at step 650 may produce all false responses, all true responses, or a mix of false and true responses from the plural lookups in the corresponding index indicator (e.g., similar to the index indicator shown in FIG. 5). As viewed in FIG. 6B, when all responses from the index lookup are false, processing continues at step 670; when all responses are true, processing continues at step 690; and when the responses are a mix of both true and false, processing continues at step 660.

Thus, when the index indicators are all false, a typical zone map scan is performed using range maps and the query predicates at step 670, and when the zone map scan generates one or more results (e.g., identified pages, data, etc.), the identified pages are further processed at step 240. When the index indicators are all true, an index lookup is performed using indices and the query predicates at step 690, and when the index lookup generates one or more results (e.g., identified pages, data, etc.), the identified pages are further processed at step 240. When the index indicators generate a mix of true and false results, as indicated in the figure, zone map scans are performed for the false results and index lookups are performed using indices for the true results and the resulting lists of pages are merged to remove duplicates. The pages from the merged result are further processed at step 240.

Figure 8:
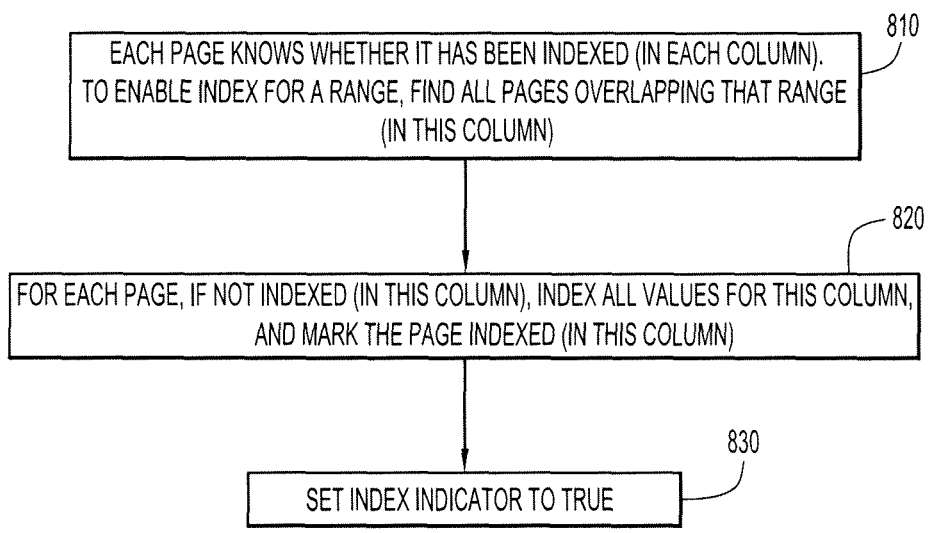
FIG. 8 is a procedural flow chart illustrating a manner in which zone maps are modified when data pages are modified according to an embodiment of the present invention.
Figure 9:
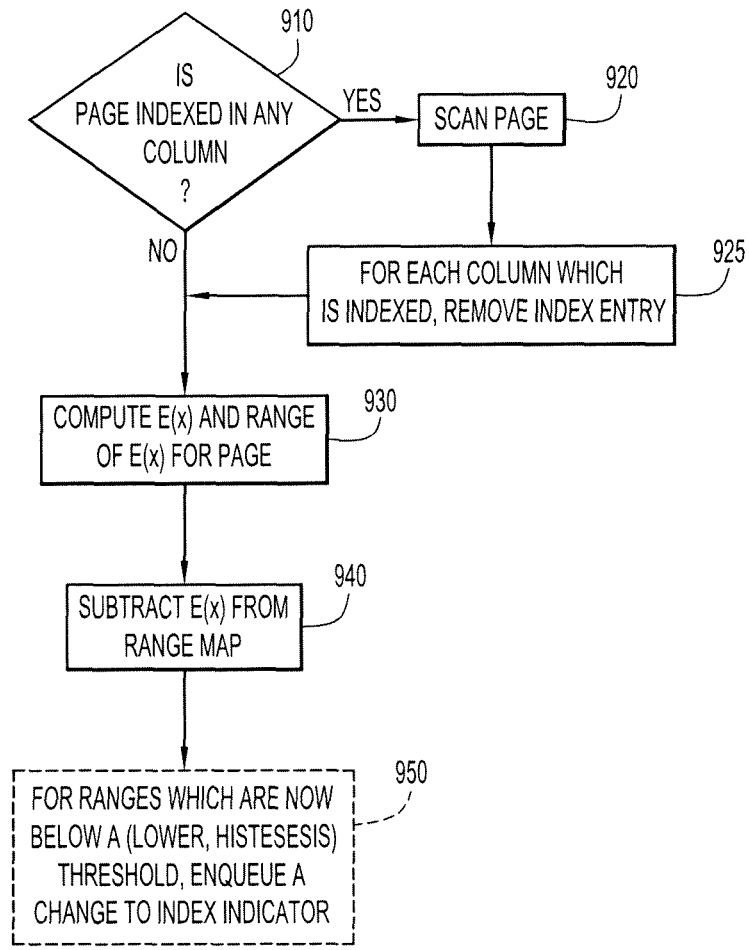
FIG. 9 is a procedural flow chart illustrating a manner in which zone maps are modified or deleted when data pages are deleted from a database according to an embodiment of the present invention.

Hybrid zone map creation, modification and deletion based on source data are described in connection with FIGS. 7-9 (e.g., as processed by hybrid metadata module 16). The hybrid zone map may comprise a zone map pointer, an index indicator pointer and an index pointer, that each refer to memory or storage locations, respectively, or the hybrid zone map may contain the actual data in lieu of pointers. In addition, plural, nested, treed (e.g., a binary tree), or other complex data structures may be employed to facilitate the efficient use of computing and storage resources according to the inventive concepts described herein.

Figure 7:
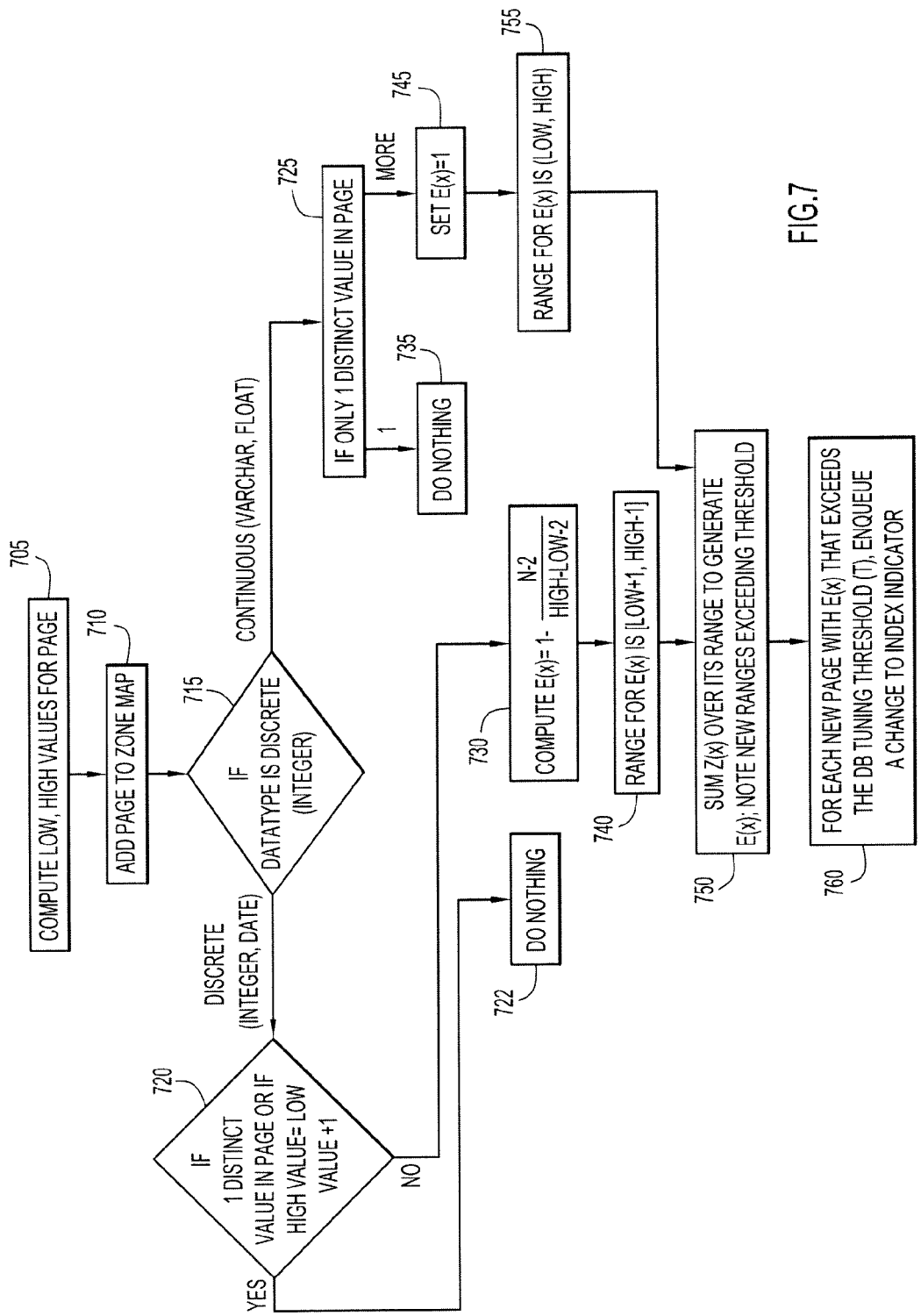
FIG. 7 is a procedural flow chart illustrating a manner in which zone maps are created or modified as new data pages are added to a database according to an embodiment of the present invention.

FIG. 7 depicts a process for adding new pages/data or updating existing pages/data to take advantage of the I/O and processing cost savings introduced by present invention embodiments. Initially, for a new page of data, all hybrid zone map data structures are empty, i.e., they contain zeroes or other form of null values. When a page of data is newly added, the low and high range map values for pages/data structures are computed at step 705. The page and range maps are added to a zone map at step 710. If the data are determined to be discrete (e.g., integer data, dates, etc.) the discrete data are processed starting at step 720 and if the data are continuous (e.g., varchar, float, real numbers, etc.), those values are processed starting at step 725.

When processing discrete data as determined at step 715, it is further determined if just one discrete value is present in the page at step 720, or if the range is otherwise trivial because the maximum value is exactly one more than the minimum value. If only one value is present, or the maximum is one more than the minimum, then nothing is done at step 722. Otherwise, $Z(x)$ for each value of x is computed at step 730. For example, $Z(x)$ may be computed if there are N values in the range from the low value to the high value as $1-((N-2)/(high-low-2))$, where subtracting two from the numerator and the denominator intentionally excludes the endpoint values from the density computation as described above. The range of values for which $Z(x)$ is applicable, i.e., the interior range values from low to high, is determined at step 740. The $Z(x)$ probabilities are summed over the range of values to generate the function $E(x)$ at step 750, e.g., as described above and in connection with FIG. 6A. For each new page with a value for $E(x)$ that exceeds the database tuning threshold T, a change to the index indicator is enqueued for processing at step 760 (e.g., to update the Boolean values (T/F) in the index indicator). As new pages are added, the index indicator may be expanded to contain the new pages. The database tuning threshold T may be determined based on several criteria including the database element data type (e.g., integer, float, character, etc.), known database characteristics, hybrid zone map generation reports, simulations, or other heuristic or deterministic techniques. Note the threshold, T, may be different for each column in a table or database. Furthermore, it should be noted that pages, zones, extents or other data constructs and sizes may be used to increase the I/O and processing efficiencies obtained by the hybrid zone map inventive concepts.

When processing continuous data as determined at step 715, it is further determined if just one distinct value is present in the page at step 725. If one value is present, then nothing is done at step 735. When more than one distinct value is present, $E(x)$ set to one for the page at step 745. The range continuous data type range (low to high) for the page is determined and added to the hybrid zone map at step 755. The process continues at steps 750 and 760 that operate as described above.

As time progresses, data may be added or removed from a page or other storage construct. As such, the range maps or indices in the hybrid zone map may need to be updated and this process is described by way of FIG. 8. In this regard, each page "knows" whether or not it has been indexed for a given column. Thus, to enable an index for a given range when it has been determined that an index is beneficial, e.g., according to the techniques and criteria described above $((E(x)=\Sigma Z(x))>T)$, all pages with range map values that overlap the given range (for that column) are determined at step 810. If the page is not indexed, then all cell values for that column are indexed and the page is marked as indexed at step 820. Lastly, the index indicator (FIG. 5) is set to true for those column values exceeding the threshold at step 830.

At some point, pages or other storage structure may be decimated or have so much data deleted that they no longer efficiently serve the underlying data construct (e.g., a page, extent, etc.). Under these circumstances, "garbage" collection may be performed to consolidate multiple data pages into a single or lesser number of data structures, and the associated range maps, indices, and index indicators may also be updated. A process for removing a page is described in connection with FIG. 9. First, it is determined whether a given page to be deleted is indexed in any column at step 910. When a page is indexed in any one column, the page is scanned at step 920 and index data are collected. For each column that is indexed, index entries are removed at step 925.

At this point, whether the columns have been indexed or not, the process continues at step 930. The $Z(x)$ for values within the column range and the corresponding $E(x)$ is computed at step 930 (e.g., as described in connection with FIG. 7 for newly added pages or using a subset of the processes described therewith). The newly re-computed E(x) is subtracted from the hybrid zone map at step 940. Alternatively, the E(x) value computed when the page was last updated may be stored with the zone map metadata for the page. Optionally, and as indicated by the dash lined box, when E(x) for a value in the range map falls below the threshold T, or a hysteresis threshold ($T_h$) to slow down system feedback, a change to the index indicator may be enqued. The index indicator may be used to disable an index for a range by setting the indicator to false without actually changing the index or the indexed pages. In other words, when the index indicator is used as a starting point, the indices and the indexed pages become "invisible" by way of the hybrid zone map. Since the underlying "stale" data are not visible or available, database clean up or "garbage collection" is not immediately required.

It should be noted that during page updates, including page removal, the locking of data is rarely required, e.g., by way of read locks, write locks, and the like, since the zone maps generally continue to return correct results during an update, e.g., as described in connection with FIGS. 8 and 9.

Present invention embodiments may be utilized for generating hybrid zone maps using any quantity of metadata (e.g., range maps, index indicators, histograms, etc.) for storage regions for any type of database (e.g., relational, object oriented, NoSQL, etc.), memory or any other storage structure.

The hybrid zone maps may be developed in any manner (e.g., manually developed, based on a template, rule based, etc.) and contain any type of data (e.g., names, integers, real numbers, etc.). The hybrid zone maps may be designed in any manner that facilitates database searching. The hybrid zone maps may be in any format (e.g., plain text, database tables, nested XML code, etc.). Any number of hybrid zone maps may be used for document searching.

A hybrid zone map hierarchy may be employed and be based on any number of levels of granularity (e.g., extents, pages, sets of rows, etc.) and may employ any desired data sizes for the hierarchy (e.g., 8 MB, 3 MB, 128 KB, 64 KB, etc.) to obtain any desired level of data hierarchy. Hybrid zone maps may be merged or divided to obtain any desired level of granularity. For example, hybrid zone maps at the zone or page level may be merged to form a complete set of metadata for an extent or other data set, or otherwise subdivided. The hybrid zone maps may be added to, deleted or modified in any manner to achieve the efficiencies describe herein.

The generated report(s) may include any information arranged in any fashion, and may be configurable based on rules or other criteria to provide desired information to a user (e.g., hybrid zone map statistics such as index cost versus zone map cost savings, the results of threshold value (e.g., T or $T_H$) variations on cost or cost profiles, the effects of element data type, etc.).

The probabilities described herein may follow any probability or probability density function. For example, as described herein the probabilities are linear densities or ratios. It should be understood that any probability function may be used such as the normal distribution (Gaussian), Poisson (e.g., if time series data were in the database), or t-tests, to name a few for the generation of the hybrid zone maps and any hybrid zone maps counterparts or structures such as range maps, zone maps, indices, index indicators, and the like, or pointer associated therewith for the access of those structures.

It will be appreciated that the embodiments described above and illustrated in the drawings represent only a few of the many ways of implementing techniques to minimize maintenance costs for database storage regions using hybrid zone maps and indices, e.g., using probabilistic balancing of index maintenance costs against the lower costs associated with zone maps for searching database storage regions The environment of the present invention embodiments may include any number of computer or other processing systems (e.g., client or end-user systems, host systems, data servers, etc.) and databases or other repositories arranged in any desired fashion, where the present invention embodiments may be applied to any desired type of computing environment (e.g., cloud computing, client-server, network computing, mainframe, stand-alone systems, etc.) for which the search engine will operate or execute (e.g., the native or target computing environment). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, hybrid metadata module, hybrid query module, etc.). These systems may include any types of monitors and input devices (e.g., keyboard, mouse, voice recognition, etc.) to enter and/or view information.

It is to be understood that the software (e.g., hybrid metadata module, hybrid query module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client, data servers, and host systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., hybrid metadata module, hybrid query module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., data, documents, hybrid zone maps, etc.). The database system may be implemented by any number of any conventional or other databases, data stores or storage structures (e.g., files, databases, data structures or tables, data or other repositories, etc.) to store information (e.g., data, documents, hybrid zone maps, etc.). The database system may be included within or coupled to the server and/or client systems. The database systems and/or storage structures may be remote from or local to the computer or other processing systems, and may store any desired data (e.g., data, documents, hybrid zone maps, etc.).

The present invention embodiments may employ any number of any type of user interface (e.g., Graphical User Interface (GUI), command-line, prompt, etc.) for obtaining or providing information (e.g., databases, documents, indices, range maps, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for generating hybrid zone maps associated with any type of database, memory or any other storage structure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for accessing data within a database object, wherein an element of the database object is stored among a plurality of different storage regions with each storage region being associated with a first value range indicating upper and lower range values for element values within that storage region, the system comprising:
    at least one processor configured to:
        determine a quantity of expected read failures associated with using the first value ranges for reading each of one or more second value ranges, wherein the second value ranges include range values comprising subsets of the first value ranges;
        generate and maintain an index for each of the one or more second value ranges having an associated quantity of expected read failures satisfying a threshold; and
        process a query including a query value by;
            identifying a second value range encompassing the query value;
            selecting one of the index and the first value ranges based on the associated quantity of expected read failures for the identified second value range and determining one or more storage regions to access utilizing the selection; and
            processing the query by reading the determined one or more storage regions.

2. The system of claim 1, wherein generating an index further includes:
    determining a score corresponding to the quantity of expected read failures for each second value range included in a storage region and summing the scores for each second value range included in the storage region to produce a total score; and
    generating the index for each second value range where the total score exceeds a predetermined threshold.

3. The system of claim 2, wherein the score for a storage region represents a probability that a value from an interval between the upper and lower range values is absent from that storage region.

4. The system of claim 3, wherein the score for a storage region is determined based on a quantity of values of the first value range within that storage region relative to the quantity of all values within the first value range.

5. The system of claim 2, wherein the summing of scores excludes the upper and lower range values for each storage region, and storage regions containing a single value.

6. The system of claim 1, wherein generating the index includes:
    maintaining information pertaining to the database object element within an index status structure; and
    providing an indicator within the index status structure to indicate the second value ranges for which an index has been generated; and
    the processor is further configured to:
        access data from the storage regions based on the index in accordance with the indicator indicating the presence of an index for the identified second value range; and access data from the storage regions based on the first value ranges in accordance with the indicator indicating the absence of an index for the identified second value range.

7. The system of claim 1, wherein the database object includes a database table and the database object element includes a database table column.

8. A computer program product for accessing data within a database object, wherein an element of the database object is stored among a plurality of different storage regions with each storage region being associated with a first value range indicating upper and lower range values for element values within that storage region, the computer program product comprising:
 a computer readable storage medium having computer readable program code embodied therewith, the computer readable program code comprising computer readable program code configured to:
  determine a quantity of expected read failures associated with using the first value ranges for reading each of one or more second value ranges, wherein the second value ranges include range values comprising subsets of the first value ranges;
  generate and maintain an index for each of the one or more second value ranges having an associated quantity of expected read failures satisfying a threshold; and
  process a query including a query value by:
   identifying a second value range encompassing the query value;
   selecting one of the index and the first value ranges based on the associated quantity of expected read failures for the identified second value range and determining one or more storage regions to access utilizing the selection; and
   processing the query by reading the determined one or more storage regions.

9. The computer program product of claim 8, wherein the computer readable program code to generate an index further includes program code configured to:
 determine a score corresponding to the quantity of expected read failures for each second value range included in a storage region and summing the scores for each second value range included in the storage region to produce a total score; and
 generate the index for each second value range where the total score exceeds a predetermined threshold.

10. The computer program product of claim 9, wherein the score for a storage region represents a probability that a value from an interval between the upper and lower range values is absent from that storage region.

11. The computer program product of claim 10, wherein the score for a storage region is determined based on a quantity of values of the first value range within that storage region relative to the quantity of all values within the first value range.

12. The computer program product of claim 9, wherein the computer readable program code to sum the scores for each second value range included in the storage region comprises computer readable program code to sum scores that exclude the upper and lower range values for each storage region, and exclude storage regions containing a single value.

13. The computer program product of claim 8, wherein the computer readable program code to generate an index further includes program code configured to:
 maintain information pertaining to the database object element within an index status structure; and
 provide an indicator within the index status structure to indicate the second value ranges for which an index has been generated; and
 the computer readable program code further comprises computer readable program code configured to:
  access data from the storage regions based on the index in accordance with the indicator indicating the presence of an index for the identified second value range; and
  access data from the storage regions based on the first value ranges in accordance with the indicator indicating the absence of an index for the second value range.

14. The computer program product of claim 8, wherein the database object includes a database table and the database object element includes a database table column.

* * * * *